Figure 1:
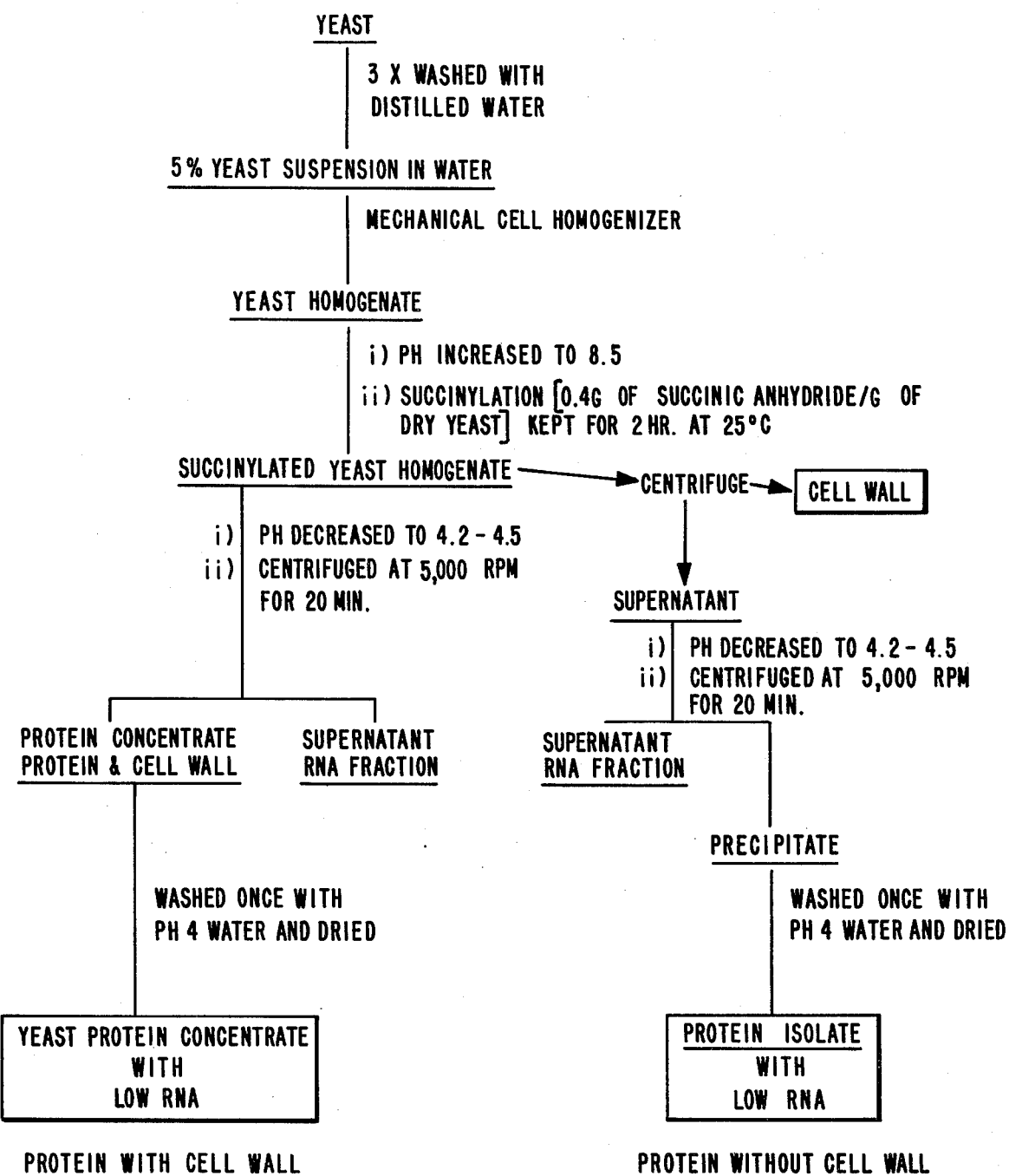

United States Patent [19]

Kinsella et al.

[11] 4,168,262

[45] Sep. 18, 1979

[54] ANHYDRIDE MODIFIED MICROBIAL PROTEIN HAVING REDUCED NUCLEIC ACID LEVELS

[75] Inventors: John E. Kinsella; Jayarama K. Shetty, both of Ithaca, N.Y.

[73] Assignee: Cornell Research Foundation, Inc., Ithaca, N.Y.

[21] Appl. No.: 886,304

[22] Filed: Mar. 13, 1978

[51] Int. Cl.² ............................................. A23J 1/18
[52] U.S. Cl. ............................................. 260/112 R
[58] Field of Search ................................. 260/112 R

[56] References Cited

U.S. PATENT DOCUMENTS

| | | | |
|---|---|---|---|
| 3,764,711 | 10/1973 | Melnychyn | 260/112 R X |
| 3,862,109 | 1/1975 | Mitsuda et al. | 260/112 R |
| 3,867,555 | 2/1975 | Newell et al. | 426/60 |
| 3,885,050 | 5/1975 | Ridgway et al. | 426/60 |
| 3,887,431 | 6/1975 | Robbins et al. | 260/112 RX |
| 3,903,314 | 9/1975 | Chao | 260/112 R X |
| 3,937,693 | 2/1976 | Towersey et al. | 260/112 R |
| 3,960,659 | 6/1976 | Fazakerley | 260/112 R X |
| 4,041,189 | 8/1977 | Towersey et al. | 260/112 R |
| 4,066,827 | 1/1978 | Solta et al. | 260/112 R X |

FOREIGN PATENT DOCUMENTS 2651464  8/1977  Fed. Rep. of Germany.

OTHER PUBLICATIONS

Chem. Abstracts, vol. 82, 1975, 140985t, Hisada et al.
Chemical Reactions of Polymers, Fettes, 1964, pp. 380–384.
Chem. Abstracts, vol. 87, 1977, 199487p, Jolly et al.

*Primary Examiner*—Howard E. Schain
*Attorney, Agent, or Firm*—Jones, Tullar & Cooper

[57] ABSTRACT

The process of the invention comprises disrupting microbial protein containing cells; derivatizing the resultant mixture comprising protein and nucleic acid with an acid anhydride; and then isoelectrically precipitating a nucleic acid diminished protein containing fraction from a nucleic acid enriched supernatant.

8 Claims, 1 Drawing Figure

ANHYDRIDE MODIFIED MICROBIAL PROTEIN HAVING REDUCED NUCLEIC ACID LEVELS

BACKGROUND OF THE INVENTION

In recent years much attention has been directed toward the development of new sources of protein for human consumption. There exists a need for protein material which can be incorporated in foods or which is usable as a basic proteinaceous substance for human consumption.

One possible solution to the problem of supplying the ever increasing world-wide need for food protein is provided by processes for the bio-synthetic manufacture of protein through the growth of microorganisms on various substrates. It is known, for example, that microorganisms such as bacteria and yeast, which are grown by single-cell reproduction, contain high proportions of proteins and can be utilized directly in foods or can be treated to recover protein isolate.

In order for single-cell proteins to compete with vegetable proteins and to share the protein market, it is necessary that it be processed to remove nucleic acid, primarily ribonucleic acid (RNA).

The human metabolic system produces uric acid as the result of the metabolism of materials such as ribonucleic acid. Since man does not have a uricase enzyme system, uric acid is not broken down and excreted with urine. However, if produced in larger quantities than the body can excrete, the body stores uric acid leading to the condition known as gout.

In 1972 the Recommended Daily Allowance of The Food and Nutrition Board, National Research Counsil in protein was 65 grams per day for a 70 kilogram adult male. The Protein Advisory Group of the United Nations System recommended that the amount of nucleic acid ingested per day from microbial protein should be less than 2 grams. Therefore, the nucleic acid content of the protein should be less than 6%, if microbial protein supplied 50% of dietary protein. The nucleic acid content should be below about 3%, if microbial protein is the sole source of protein in the diet.

Various methods have been proposed to reduce nucleic acid in microbial derived protein.

U.S. Pat. No. 4,066,827 describes a polyion complex having a nucleic acid base, which is disclosed as useful in the separation and purification of proteins.

U.S. Pat. No. 3,885,050 describes treating protein containing microbial cells with aqueous alcoholic solutions to remove undesirable flavor and odor substances.

U.S. Pat. No. 3,937,693 describes reducing the nucleic acid content of microbial protein by the use of an alcohol, coupled with pH and temperature control.

U.S. Pat. No. 3,960,659 describes reducing the nucleic acid content by the use of extra-cellular ribonuclease.

U.S. Pat. No. 3,867,555 describes the use of alkali to reduce nucleic acid in microbial protein.

U.S. Pat. No. 4,041,189 teaches the reduction of nucleic acid content in certain Fungi Imperfecti by controlling pH and temperature.

U.S. Pat. No. 3,887,431 describes a process for reducing nucleic acid in microbial protein products involving utilization of endogenous nuclease.

U.S. Pat. No. 3,903,314 describes several methods for reducing nucleic acid content of microbial proteins.

DESCRIPTION OF THE INVENTION

The process of the invention comprises disrupting microbial protein containing cells and then derivatizing the resultant mixture comprising protein, cell debris and nucleic acid with an acid anhydride, and then isoelectrically precipitating a nucleic acid diminished protein containing fraction, from a nucleic acid enriched supernatant.

The practice of this invention is broadly applicable to microorganisms and particularly to those organisms classified as bacteria, yeasts, and fungi. By way of illustration bacteria such as those listed in Table I, yeasts such as those listed in Table II and fungi such as those listed in Table III are suitable microorganisms.

TABLE I—SUITABLE BACTERIA

Acetobacter sp.
Arthrobacter sp.
*Bacillus subtilis*
Corynebacteria sp.
Micrococcus sp.
Pseudomonas sp.

TABLE II - SUITABLE YEASTS

*Candida curvata*
*Candida lipolytica*
*Candida pulcherima*
*Candida utilis*
*Hansenula anomala*
*Hansenula miso*
*Oidium lactis*
*Succharomyces carlsbergensis*
*Saccharomyces fragilis*
*Saccaromyces elipsoideus*
*Trichosporon cutaneum*
*Saccharomyces cerevisiae*
*Candida parapsilosis*
*Hansenula wickerhamii*
*Pichia pastoris*
*Pichia haplophyla*

TABLE III—SUITABLE FUNGI

*Aspergillus niger*
*Aspergillus glaucus*
*Aspergillus oryzae*
*Aspergillus terreus*
*Aspergillus itaconicus*
*Penicillium notatum*
*Penicillium chrysogenum*
*Penicillium glaucum*
*Penicillium griseofulvum*
*Penicillium funiculosum*
*Fusarium graminearum (ATCC 20334)*
*Fusarium solani (ATCC 20328)*
*Fusarium oxysorium (ATCC 201281)*

Candida utilis, Saccharomyces cerevisiae, Saccharomyces fragilis, and Saccharomyces carlsbergensis are preferred starting materials for the process of this invention, however, because each has been generally regarded by the F.D.A. as safe for use in food products.

Microbial cells suitable for the process of this invention may be grown aerobically in either a batch or continuous manner. Any suitable carbon-affording substrate may be employed although, for purposes of preparing SCP products for use in foods, an ethanol substrate is preferred. Any convention combination of mineral nutrient elements may be employed. A convenient source of nitrogen is ammonia which may also be supplied to the fermentor as required to maintain the pH of the fermentation broth, preferably within the range from 3.5 to 5.5. Cells which have been grown at a rapid rate usually have a higher nucleic acid content while those grown more slowly tend to have a more permeable cell wall. Either of these types, as well as cells grown under oxygen-limiting or substrate-limiting conditions may be usefully treated according to the present invention to afford improved and acceptable foods and food components suitable for human consumption.

Rupture of the microbial cells may be accomplished by any suitable physical means at appropriate temperatures. Thus, for example, any homogenizer, colloid mill, ball mill or ultrasonic device may be employed.

In the process of the invention, derivatization of the microbial protein nucleic acid mixture is accomplished by contacting the mixture with an organic dicarboxylic acid anhydride. The presently preferred anhydride is succinic anhydride. While the selection of the anhydride is not unduly critical, so long as the anhydride group is reactive with protein amino groups, it is preferred that the anhydride contain 10 carbon atoms or less and it is most preferred that the anhydride contain 6 carbon atoms or less. Examples of anhydrides include cylic anhydrides such as succinic anhydride, glutaric anhydride, maleic anhydride, itaconic anhydride, citraconic anhydride, dimethyl maleic anhydride, glutaconic anhydride, $\alpha\alpha^1$-dimethyl glutaconic acide and phthalic anhydride.

It is believed that the anhydride reacts both with the free amino groups of the protein and the amino and the hydroxyl groups of the nucleic acid. The amount of anhydride employed in the derivatization step is an amount at least sufficient to enhance the separation of the microbial protein from the nucleic acid, when the protein fraction is isoelectrically precipitated from the aqueous reactum medium.

It is preferred that an amount of anhydride be employed which is an amount to cause at least about 80% of substantially complete reaction as determined by the pH monitoring method described hereinafter.

It is most preferred that an amount of anhydride be employed which at least substantially reacts with the disrupted microbial cellular suspension as determined by the pH monitoring method.

Typically the microbial protein containing cells are suspended in aqueous media and disrupted. The concentration of the cellular material is not critical and depends in part on the most efficient concentration useful in the disruption or homogenization equipment. Five to ten percent cellular suspensions are commonly employed.

The anhydride derivatization step is conducted at a pH of about 7.5 or higher, usually between a pH of about 7.5 to about 9.0. The temperature during the derivatization step is usually held below about 40° C. in order to avoid undesired protein reactions. Most conveniently, the derivatization step is conducted at ambient temperatures; e.g., about 25° C.

It is essential that the anhydride be added to the cell homogenate incrementally, monitoring and adjusting the pH continuously or incrementally to maintain the pH above about 7.5.

Monitoring the pH serves a dual function, since when sufficient anhydride has been added so that after a reasonable reaction time; e.g., 15 mintues to an hour, no drop in pH is noted, substantially complete reaction of the anhydride with the protein-nucleic acid mixture is indicated.

After completion of the derivatization step, the pH of the system is lowered to the isoelectric point of the protein, typically in the pH range of about 4.0 to about 4.5, depending on the protein, causing precipitation of a nucleic acid diminished protein fraction from a nucleic acid enriched supernatant.

Alternatively, if a cell wall free or cell wall content reduced protein product is desired, the cell debris can be removed from the aqueous medium by appropriate means, such as centrifugation, prior to the protein precipitation step.

An embodiment of the invention is described below with reference to the flow chart (FIG. 1):

*Saccharomyces cerevisiae* or *S. carlsbergenesis* yeast cells, with a nucleic acid content of about 12 to 15 grams of nucleic acid per 100 grams of crude protein, were washed three times with distilled water. A chilled 5% suspension of the cells in water was homogenized by means of three passes through a Manton-Gaulin homogenizer at 8000 psig.

The pH of the homogenate was raised to 8.5 with aqueous alkali (NaOH). Succinic anhydride was incrementally added over a two hour period at 25° C. (total additional 0.4 gram of succinic anhydride per gram of dry yeast).

At this point the resultant aqueous suspension was divided into two parts.

The first part was treated to yield a cell wall containing protein concentrate by decreasing the pH of the mass to between 4.2 to 4.5 using hyelrochloric acid, and centrifuging at 5,000 rpm for twenty minutes. This precipitated protein concentrate was washed once with pH4 water and dried to yield a protein concentrate containing between 1 and 2% nucleic acid.

The second part of the aqueous suspension was treated to yield a protein isolate. Cell debris was removed by centrifugation and the supernatant was then pH adjusted and centrifuged as above to yield a protein precipitate which was washed with pH4 water and dried to yield a protein isolate containing between 1 and 2.5% nucleic acid and 92% protein.

The process of the invention can be conducted on a continuous or batch basis. And, while the process of the invention has been described as starting with a freshly cultured microbial cell material, it is applicable to preformed microbial proteinaceous material containing undesirable levels of nucleic acid.

While the invention has been exemplified above, it is understood that other microbial protein containing cellular material such as those described above can be utilized in place the particular yeast employed. The same is true for the anhydride. Likewise, the process conditions can vary within the skill of the art.

All parts and percentages throughout the specification are by weight unless otherwise specified. All temperatures are degrees Centigrade unless otherwise specified.

We claim:

1. A method of reducing nucleic acid in microbially derived protein which comprises:
   (a) disrupting microbial cells to provide a mixture comprising protein and nucleic acid,
   (b) derivatizing an aqueous mixture comprising said protein and nucleic acid with an organic acid anhydride at a pH of above about 7.5, and then (c) reducing the pH to isoelectically precipitate a nucleic acid diminished protein concentrate.

2. A method as in claim 1 where the protein-nucleic acid mixture is derived from *Candida utilis, Saccharomyces cerevisiae, Saccharomyces fragilis,* or *Saccharomyces carlsbergensis.*

3. A method as in claims 1 or 2 where the anhydride is succinic anhydride, dimethyl maleic anhydride or maleic anhydride.

4. A method as in claim 3 where the anhydride is succinic anhydride.

5. A method as in claims 1 or 2 where the anhydride is a cyclic anhydride.

6. A method as in claim 1 where the anhydride is citraconic anhydride.

7. A method as in claims 1, 2 or 6 where the isolectric precipitation of the protein concentrate is conducted at a pH of 4.2 to 4.5.

8. In a method of forming a nucleic acid diminished protein concentrate from a mixture of protein and nucleic acid obtained by disrupting microbial cells, the steps comprising:
(a) derivatizing an aqueous mixture comprising the protein nucleic acid mixture with a cyclic organic anhydride at a pH of above about 7.5, and then
(b) reducing the pH to isoelectically precipitate a nucleic acid diminished protein concentrate.

* * * * *